(12) United States Patent
Bourgois et al.

(10) Patent No.: US 9,581,334 B2
(45) Date of Patent: Feb. 28, 2017

(54) ANNULAR COMBUSTION CHAMBER IN A TURBINE ENGINE

(71) Applicant: SNECMA, Paris (FR)

(72) Inventors: Sebastien Alain Christophe Bourgois, Saint Germain les Corbeil (FR); Denis Jean Maurice Sandelis, Nangis (FR)

(73) Assignee: SNECMA, Paris (FR)

( * ) Notice: Subject to any disclaimer, the term of this patent is extended or adjusted under 35 U.S.C. 154(b) by 197 days.

(21) Appl. No.: 14/348,966

(22) PCT Filed: Oct. 22, 2012

(86) PCT No.: PCT/FR2012/052415
§ 371 (c)(1),
(2) Date: Apr. 1, 2014

(87) PCT Pub. No.: WO2013/060974
PCT Pub. Date: May 2, 2013

(65) Prior Publication Data
US 2015/0020501 A1    Jan. 22, 2015

(30) Foreign Application Priority Data
Oct. 26, 2011 (FR) ...................................... 11 59715

(51) Int. Cl.
*F23R 3/02* (2006.01)
*F02C 7/266* (2006.01)
(Continued)

(52) U.S. Cl.
CPC ................ *F23R 3/02* (2013.01); *F02C 7/264* (2013.01); *F02C 7/266* (2013.01); *F23R 3/16* (2013.01); *F23R 3/18* (2013.01); *F23R 3/50* (2013.01)

(58) Field of Classification Search
CPC ...... F23R 3/02; F23R 3/16; F23R 3/18; F23R 3/50; F02C 7/264; F02C 7/266
(Continued)

(56) References Cited

U.S. PATENT DOCUMENTS 2,647,369 A * 8/1953 Leduc ....................... F23R 3/04
                                                   60/39.5
3,373,562 A * 3/1968 Wormser .................. F23R 3/18
                                                   366/337
(Continued)

FOREIGN PATENT DOCUMENTS

EP    1 870 581    12/2007
FR    2 943 119    9/2010

OTHER PUBLICATIONS

International Search Report Issued Aug. 30, 2013 in PCT/FR12/052415 Filed Oct. 22, 2012.

*Primary Examiner* — Steven Sutherland
(74) *Attorney, Agent, or Firm* — Oblon, McClelland, Maier & Neustadt, L.L.P.

(57) ABSTRACT

An annular combustion chamber of a turbine engine, the chamber including inner and outer coaxial walls forming two surfaces of revolution, which are connected together upstream by an annular chamber end wall including injection systems passing therethrough, each including an injector and at least one swirler for producing a rotating air stream that mixes downstream with fuel from the injector, and at least one ignition spark plug mounted in an orifice of the outer wall downstream from the injection systems. The spark plug is situated circumferentially between two adjacent injection systems that are configured to produce two air/fuel mixture sheets rotating in opposite directions.

10 Claims, 4 Drawing Sheets

(51) Int. Cl.
  *F23R 3/16*    (2006.01)
  *F23R 3/18*    (2006.01)
  *F23R 3/50*    (2006.01)
  *F02C 7/264*   (2006.01)

(58) Field of Classification Search
  USPC .................. 60/39.827, 39.821, 748, 740
  See application file for complete search history.

(56) References Cited

U.S. PATENT DOCUMENTS

| | | | | |
|---|---|---|---|---|
| 3,834,159 | A | * | 9/1974 | Vdoviak .................. F23R 3/14 |
| | | | | 239/403 |
| 4,991,398 | A | | 2/1991 | Clark et al. |
| 5,257,500 | A | * | 11/1993 | Venkataramani ....... F02C 7/264 |
| | | | | 219/121.5 |
| 6,360,525 | B1 | * | 3/2002 | Senior ...................... F23R 3/12 |
| | | | | 60/747 |
| 2002/0178726 | A1 | | 12/2002 | Carita et al. |
| 2010/0229559 | A1 | | 9/2010 | Lains et al. |

* cited by examiner

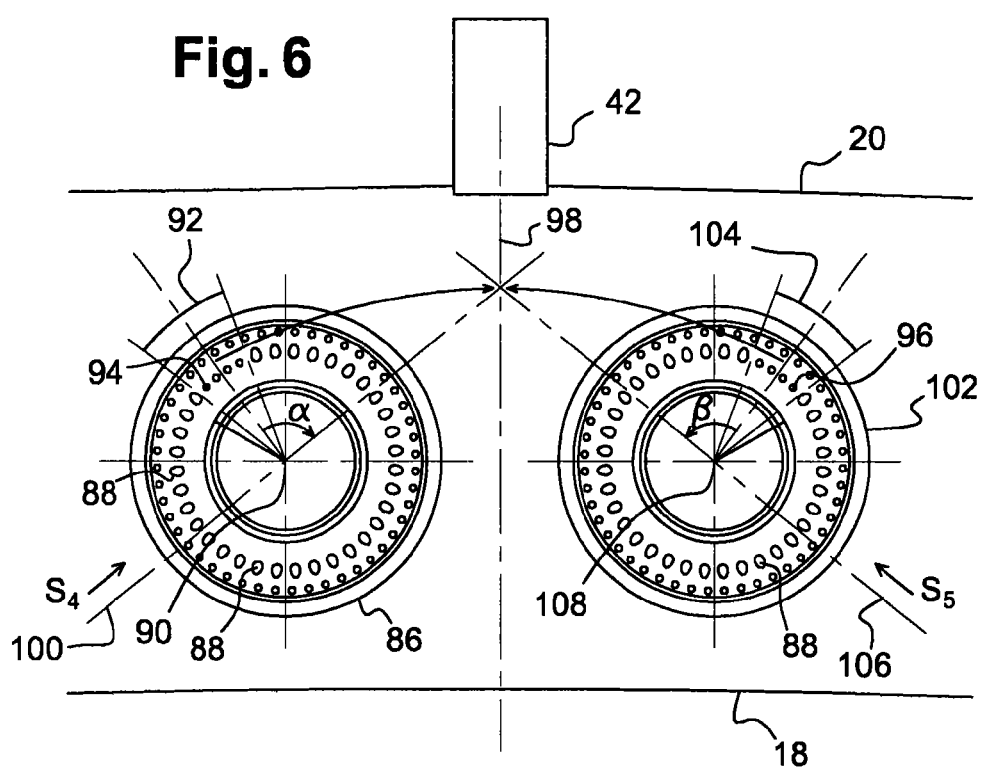
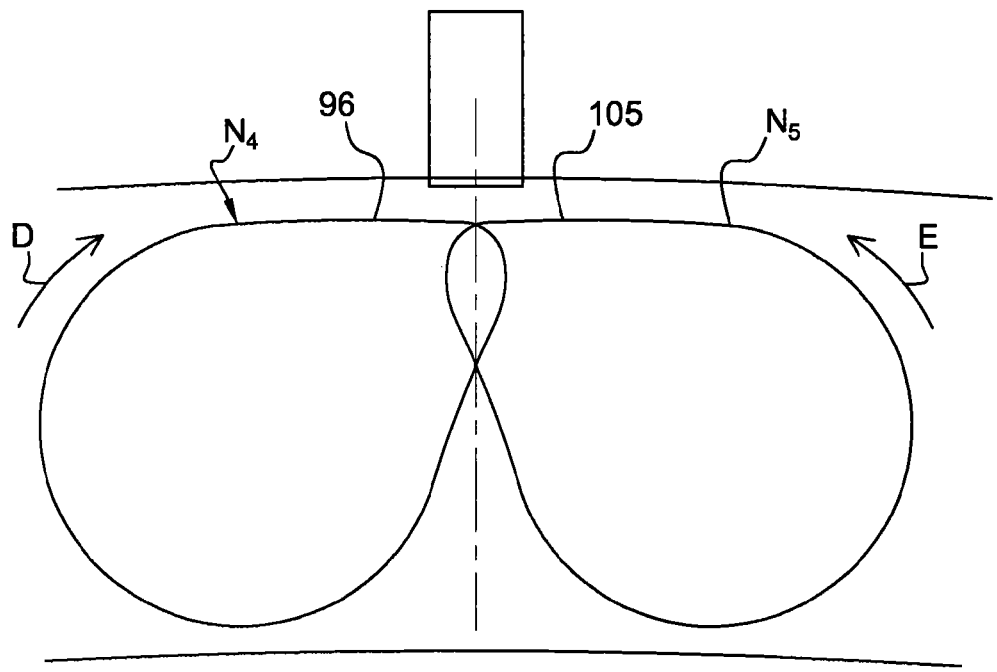

ANNULAR COMBUSTION CHAMBER IN A TURBINE ENGINE

BACKGROUND OF THE INVENTION

Field of the Invention

The present invention relates to an annular combustion chamber of a turbine engine such as an airplane turbojet or turboprop.

Description of the Related Art

In known manner, an annular combustion chamber of a turbine engine receives a stream of air from an upstream high pressure compressor and it delivers a stream of hot gas downstream for driving rotors of high pressure and low pressure turbines.

An annular combustion chamber comprises two coaxial walls forming surfaces of revolution that extend one inside the other and that are connected together and their upstream ends by an annular chamber end wall that includes openings for mounting fuel injection systems.

Each injection system has means for supporting the head of a fuel injector and at least one swirler, which is arranged downstream from the injector head, coaxially about its axis, and which delivers a stream of air that is rotating in order to form a mixture of air and fuel that is to be burnt in the combustion chamber.

The swirlers of the injection systems are fed with air coming from an annular diffuser mounted at the outlet from the high pressure compressor that is arranged upstream from the combustion chamber.

Each swirler opens out downstream into the inside of a mixer bowl having a substantially frustoconical downstream wall that flares downstream and that is formed with an annular row of air injection orifices that are regularly distributed around the axis of the bowl.

At least one ignition spark plug is mounted in an orifice in the outer annular wall of the combustion chamber, downstream from the fuel injection systems.

In operation, the air leaving the high pressure compressor flows inside each injection system. The air/fuel mixture is ejected from each injection system and forms a substantially frustoconical rotating sheet of air and fuel that flares downstream. The flare angle of the sheet is a function of the flare angle of the frustoconical wall of the mixer bowl, and of the dimensions of the air injection orifices formed in said frustoconical wall. Thus, the larger the diameter of the orifices in the mixer bowl, the greater the flow rate of air passing each through each of these orifices and the smaller the extent to which the air/fuel mixture sheet flares. Likewise, the further upstream the holes are positioned along the frustoconical wall, the greater the aerodynamic blocking and the less the extent to which the air/fuel mixture sheet flares.

In the prior art, the injection systems of the combustion chamber produce air/fuel mixture sheets that all rotate in the same direction. The direction of rotation may equally well be clockwise or counterclockwise when looking at the injection systems from downstream.

In order to improve ignition of the air/fuel mixture sheets, it is known to arrange a spark plug on the axis of an injection system.

In its application FR 2 943 199, the Applicant proposes increasing the flare angle of the fuel sheet produced by the injection system situated closest to the spark plug. That type of configuration is found to be effective, but it can lead to the inside end of the spark plug being wetted by droplets of fuel, and that is not desirable in order to conserve optimum operation of the spark plug.

BRIEF SUMMARY OF THE INVENTION

An object of the invention is to improve the ignition of the fuel mixture sheets compared with combustion chambers of the prior art while avoiding the drawbacks of the prior art.

To this end, the invention proposes an annular combustion chamber of a turbine engine, the chamber having inner and outer coaxial walls forming two surfaces of revolution connected together at their upstream ends by an annular chamber end wall including openings for mounting injection systems, each comprising an injector and at least one swirler for producing a rotating air stream that mixes downstream with fuel coming from the injector, and at least one ignition spark plug mounted in an orifice in the outer wall downstream from the injection systems, the chamber being characterized in that the spark plug is situated circumferentially between two adjacent injection systems that are configured so as to produce two air/fuel mixture sheets rotating in opposite directions.

Unlike the prior art, the spark plug is mounted between two injectors and the injection systems on either side of the spark plug are configured to produce sheets of fuel that are contrarotating. This ensures good interpenetration of the fuel sheets on the axis of the spark plug, thereby increasing the time spent by the droplets of fuel in the vicinity of the inside end of the spark plug compared with the prior art. The effectiveness with which the combustion chamber is ignited or re-ignited is thus improved.

Advantageously, as seen from downstream, a first of the two injection systems that is situated circumferentially to the left of the spark plug produces an air/fuel mixture sheet rotating clockwise and a second of the two injection systems situated circumferentially to the right of the spark plug produces an air/fuel mixture sheet rotating counterclockwise.

With such a configuration, a fuel droplet recirculation zone is observed to form in the vicinity of the inside end of the spark plug, and the droplets of fuel within this recirculation zone are smaller, thereby further improving ignition or re-ignition of the combustion chamber.

This configuration is more advantageous than the configuration in which, seen from downstream, a first of the two injection systems situated circumferentially to the left of the spark plug produces an air/fuel mixture sheet rotating counterclockwise and a second of the two injection systems situated circumferentially to the right of the spark plug produces an air/fuel mixture sheet rotating clockwise, since the recirculation zone would then tend to be created beside the annular wall defining the inside of the combustion chamber.

In an embodiment of the invention, each of the two above-specified adjacent injection systems comprises a bowl having a substantially frustoconical wall downstream from the swirler and formed with an annular row of air injection orifices for producing a substantially frustoconical and rotating sheet of air/fuel mixture, these orifices being distributed and dimensioned in such a manner that the resulting air/fuel mixture sheet presents a local enlargement crossing the axis of the spark plug.

With such a configuration, the same flare angle is conserved for both bowls situated on either side of the spark plug, and modifications to the orifices in the bowls make it possible to form a local enlargement of their fuel sheets crossing the axis of the spark plug.

These enlargements of the fuel sheets enable the fuel sheets to be projected locally as close as possible to the inside end of the spark plug, thereby further increasing the time spent by the droplets in the vicinity of the inside end of the spark plug and improving ignition of the air/fuel mixture.

According to another characteristic of the invention, the bowl of at least one of the two injection has orifices of diameter smaller than the diameter of the other orifices of said bowl, these smaller-diameter orifices being formed over an angular sector of size and angular position that are predetermined so as to form the enlargement crossing the axis of the spark plug.

Reducing the diameter of the orifices over a given sector of the bowl makes it possible to reduce the flow rate of air passing through these orifices. The air leaving via these orifices has less impact on the air/fuel mixture coming from the upstream swirler, thereby leading to a local increase in the flare angle of the air/fuel mixture and forming a local enlargement of the sheet of fuel.

According to another characteristic of the invention, the orifices of the above-mentioned angular sector of each above-mentioned bowl present a diameter that is at least 40% smaller than the diameter of the other orifices in the bowl.

In another embodiment of the invention, the bowl of at least one of the two injection systems has no orifices over an angular sector of dimension and position that are predetermined in such a manner as to form the enlargement crossing the axis of the spark plug.

Eliminating orifices in the frustoconical wall of the bowl over a sector makes it possible to increase locally the ejection angle of the air/fuel mixture sheet, and to form a local enlargement of said sheet that crosses the axis of the spark plug.

The angular sectors of the two injection systems are preferably symmetrical to each other about a radial plane containing the axis of the spark plug.

In a practical embodiment of the invention, the or each above-mentioned angular sector extends over an angle of about 20° to 50°.

The spark plug is advantageously positioned at substantially equal circumferential distances from the two adjacent injection systems.

The invention also proposes a turbine engine, such as an airplane turbojet or turboprop that includes a combustion chamber as described above.

BRIEF DESCRIPTION OF THE SEVERAL VIEWS OF THE DRAWINGS

Other advantages and characteristics of the invention appear on reading the following description made by way of non-limiting example and with reference to the accompanying drawings, in which:

FIG. 6 is a diagrammatic view in cross-section of a variant embodiment of the invention showing two injection systems situated on either side of the spark plug;

FIG. 7 is a diagrammatic view on a cross-section plane containing the axis of the spark plug and showing the sheets of fuel from the injection systems of FIG. 6.

DETAILED DESCRIPTION OF THE INVENTION

Figure 1:
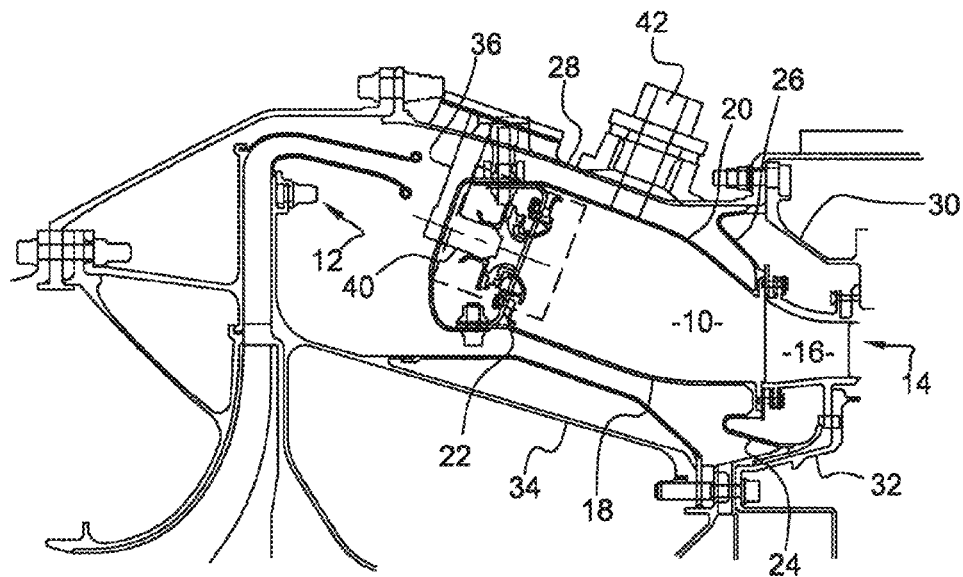
FIG. 1 is a fragmentary diagrammatic half-view in axial section of an annular combustion chamber of known type.

Reference is made initially to FIG. 1, which shows an annular combustion chamber 10 of a turbine engine such as an airplane turboprop or turbojet, the combustion chamber being arranged at the outlet from a centrifugal diffuser 12 mounted at the outlet from a high pressure compressor (not shown). The combustion chamber 10 is followed by a high pressure turbine 14 with only its inlet nozzle 16 being shown.

The combustion chamber 10 comprises coaxial inner and outer walls 18 and 20 constituting two frustoconical surfaces of revolution arranged one inside the other and of section that tapers going downstream. Such a combustion chamber is said to be convergent. The inner and outer annular walls 18 and 20 are connected at their upstream ends to an annular chamber end wall 22 and they are secured downstream via inner and outer annular flanges 24 and 26. The outer annular flange 26 bears radially outwardly against an outer casing 28 and bears axially against a radial flange 30 for fastening the nozzle 16 of the high pressure turbine to the outer casing 28. The inner annular flange 24 of the combustion chamber bears radially and axially against an inner annular part 32 for fastening the nozzle 16 to an inner annular wall 34.

The chamber end wall 22 has openings for mounting injection systems for injecting an air-fuel mixture into the chamber, the air coming from the centrifugal diffuser 12 and the fuel being delivered by injectors 36.

The injectors 36 have their radially outer ends fastened to the outer casing 28 and they are regularly distributed along a circumference around the axis of revolution 38 of the chamber. Each injector 36 has an injection head 40 at its radially inner end for injecting fuel, which head is in alignment with a corresponding opening in the chamber end wall 22.

The mixture of air and fuel that is injected into the chamber 10 is ignited by means of at least one ignition spark plug 42 that extends radially to the outside of the chamber 10. The radially outer end of the spark plug is held to the outer casing 28 by suitable means, it is connected to electrical power supply means (not shown) situated outside the casing 28, and its inner end is engaged in an orifice in the outer wall 20 of the chamber.

Figure 2:
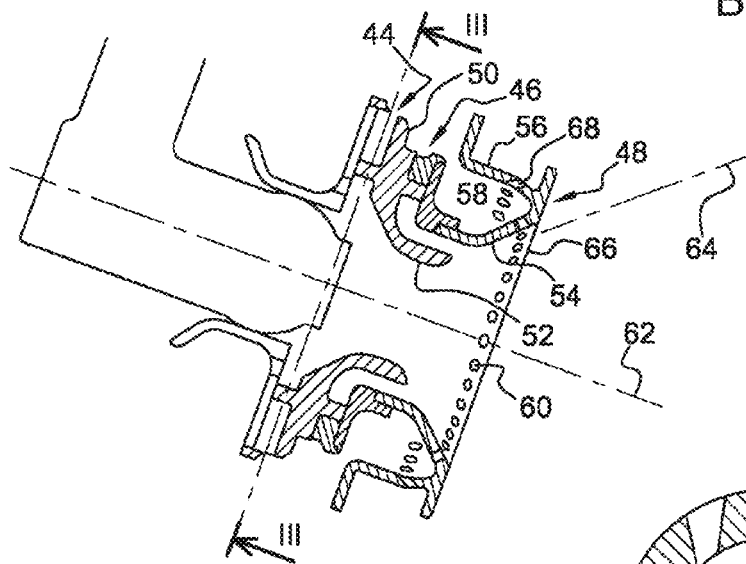
FIG. 2 is a fragmentary diagrammatic view on a larger scale of the zone in the dashed-line box of FIG. 1.

As can be seen in FIG. 2, each injection system includes an upstream primary swirler 44 and a downstream secondary swirler 46, which swirlers are on the same axis and are connected upstream to means for centering and guiding the head of the injector, and downstream to a mixer bowl 48 that is mounted axially in the opening in the chamber end wall 22.

The swirlers 44 and 46 are spaced apart from each other by a radial wall 50 having its radially inner end connected to a Venturi 52 that extends axially downstream inside the downstream swirler and that separates the flows of air coming from the upstream and downstream swirlers 44 and 46. A first annular air flow stream is formed inside the Venturi 52 and a second annular air flow stream is formed outside the Venturi 52.

The mixer bowl 48 has a substantially frustoconical wall 54 that flares downstream and that is connected at its downstream end to a cylindrical rim 56 extending upstream and mounted axially in the opening in the chamber end wall 22. The upstream end of the frustoconical wall of the bowl is fastened by an intermediate annular part 58 to the downstream secondary swirler 46.

The frustoconical wall 54 of the bowl has an annular row of air injection orifices 60 that are regularly distributed around the axis 62 of the bowl 48. The air passing through these orifices and the air flowing in the streams inside and outside the Venturi 54 become mixed with the fuel that is sprayed by the injector so as to form a rotating sheet 64 of an air and fuel mixture having a substantially frustoconical shape that flares downstream. The axes 66 of each of the air injection orifices 60 of the bowl 48 slope relative to the axis 62 of the bowl and converge towards said axis going downstream. A second annular row of orifices 68 is formed at the downstream end of the cylindrical rim 56.

In operation, the upstream and downstream swirlers 44 and 46 of the injection system cause the stream of air and sprayed fuel to rotate, and the air injection orifices 60 in the frustoconical wall 54 of the bowl 48 apply shear to the air/fuel mixture. Thus, the greater the diameter of the air injection orifices 60 of the bowl 48, the greater the flow of air passing through these orifices, thereby diminishing the flare angle 64 of the frustoconical sheet of the air/fuel mixture.

Figure 3:
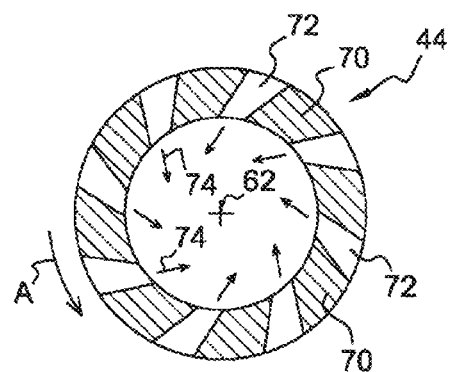
FIG. 3 is a diagrammatic view in cross-section of the primary swirler of the FIG. 2 injection system.

FIG. 3 is a diagrammatic view of the primary swirler 44 shown in cross-section as seen from downstream, the section being on a line of the injection system shown in FIG. 2.

The primary swirler 44 has a plurality of vanes 70 regularly distributed around the axis 62 of the swirler 44. These vanes 70 extend radially and circumferentially, and between them they define air-passing channels 72 opening out into the inside of the swirler 44. The inner openings of the channels 72 are all oriented in directions 74 that are inclined relative to the axis 62 of the swirler 44 so as to produce a stream of air that is rotating in a counterclockwise direction (arrow A).

With such a primary swirler 44, the mixture of air and fuel leaving the injection system forms a sheet of a mixture of air and fuel that rotates counterclockwise.

The secondary swirler 46 also has a plurality of vanes regularly distributed around the axis of the swirler. These vanes extend radially and circumferentially and between them they define air passage channels. In a manner similar to the primary swirler, the inner openings of the channels in the secondary swirler are all oriented in directions that are inclined relative to the axis of the secondary swirler so as to produce a stream of air rotating in the counterclockwise direction.

In a variant of the invention, the inner openings of the channels in the secondary swirler 46 may be oriented in directions that are inclined relative to the axis of the secondary swirler so as to produce a stream of air rotating in the clockwise direction, i.e. a stream of air that is rotating in the opposite direction to the stream of air from the primary swirler.

The secondary swirler serves to accelerate expansion of the air/fuel mixture leaving the injection system. It also serves to generate shear with the slowed-down outlet flow from the Venturi, thereby contributing to improving the spraying of the air/fuel mixture.

The injection system may thus have primary and secondary swirlers that are co-rotating, i.e. both of them lead to forming a respective stream of air rotating in the same direction, or else it has primary and secondary swirlers producing streams of air that are rotating in opposite directions. Under such circumstances, the direction of rotation of the air/fuel mixture leaving the injection system is driven mainly by the pitch angles of the outlets of the channels of the primary and secondary swirlers and also by the flow rates passing through the primary and secondary swirlers.

In the combustion chamber shown in FIG. 1, all of the injection systems are configured in the same way and they produce sheets of air/fuel mixture that all rotate in the same counterclockwise direction.

Figure 4:
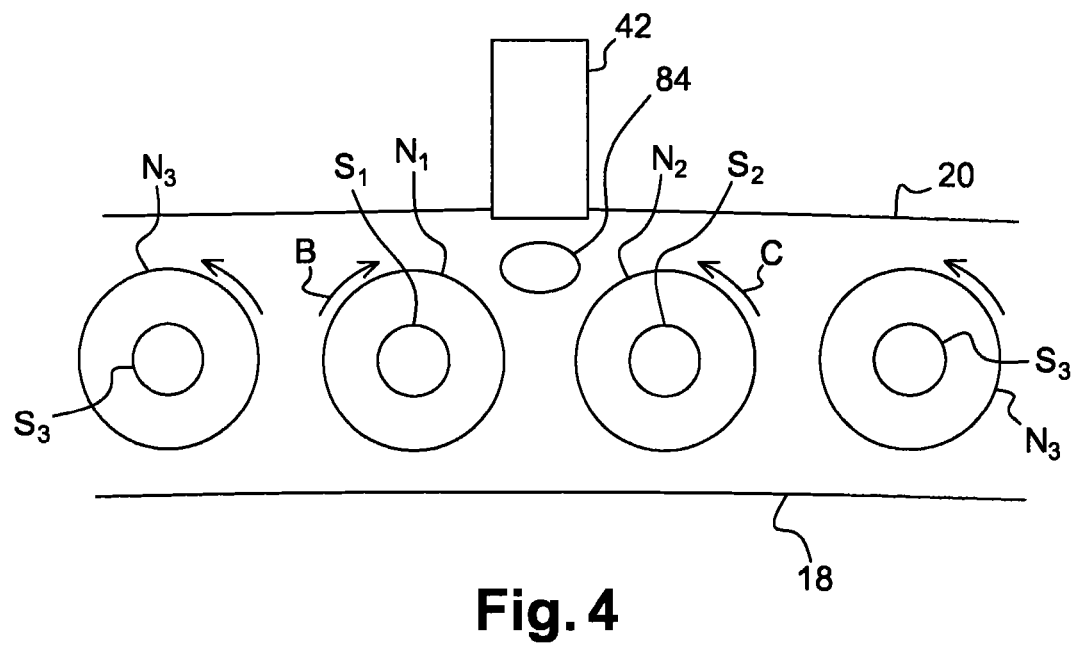
FIG. 4 is a diagrammatic view from downstream and in cross-section showing injection systems producing contrarotating sheets of air/fuel mixture, which systems are situated on either side of a spark plug in a combustion chamber of the invention.

The invention serves to improve ignition or re-ignition of the combustion chamber by mounting the ignition spark plug 42 circumferentially between two adjacent injection systems $S_1$, $S_2$ that produce respective air/fuel mixture sheets $N_1$, $N_2$ rotating in opposite directions (arrows B and C in FIG. 4).

Figure 5:
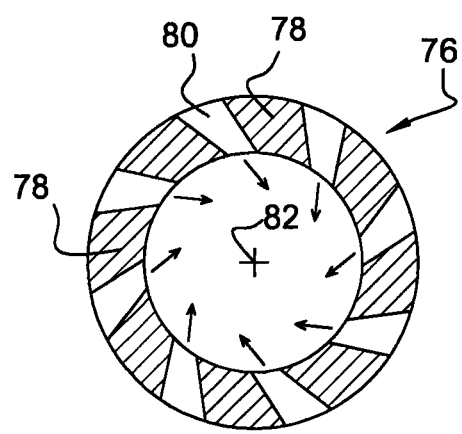
FIG. 5 is a diagrammatic view in cross-section of the primary swirler of the FIG. 4 injection system situated circumferentially immediately to the left of the spark plug.

The injection system $S_1$ arranged circumferentially immediately to the left of the spark plug when seen from downstream has a primary swirler similar to that described with reference to FIG. 3. This swirler 76 differs in that the vanes 78 define between them channels 80 that have their inner openings all oriented in directions that are inclined relative to the axis 82 of the swirler 76 in such a manner as to produce a stream of air rotating in the clockwise direction (FIG. 5).

The injection system $S_2$ arranged circumferentially immediately to the right of the spark plug has a primary swirler 44 that is identical to that described with reference to FIG. 3.

The other injection systems $S_3$, i.e. those that are not situated circumferentially immediately beside the spark plug 42, all produce air fuel mixture sheets $N_3$ that are rotating in the same direction. This direction of rotation may either be clockwise or counterclockwise (FIG. 4).

Mounting the spark plug 42 between two adjacent injection systems $S_1$, $S_2$ that produce contrarotating air/fuel mixture sheets $N_1$, $N_2$ makes it possible to form a recirculation zone 84 of fuel droplets very close to the inside end of the spark plug 42. The flow directions of the droplets within the recirculation zone 84 are very varied, thus contributing to increasing the length of time the droplets of fuel spend in the vicinity of the spark plug and improving ignition of the combustion chamber. Furthermore, the droplets of fuel in the recirculation zone 84 are finer, thus further facilitating the formation of a combustion flame.

FIG. 6 is a diagrammatic view from downstream of two adjacent injection systems $S_4$, $S_5$ circumferentially on either side of the spark plug 42, and FIG. 7 shows the air/fuel mixture sheets N4 and N5 produced by the respective injection systems $S_4$ and $S_5$.

The injection system $S_4$ situated circumferentially to the left of the spark plug 42 has a primary swirler 76 matching that described with reference to FIG. 5 so as to produce an air/fuel mixture sheet $N_4$ rotating clockwise (arrow D in FIG. 7). This injection system $S_4$ has a mixer bowl 86 with a plurality of air injection orifices 88 regularly distributed around the axis of the bowl 90. The bowl 86 has an angular sector 92 in which the orifices 94 are of diameter smaller than the diameter of the other orifices 88 of the bowl 86 (FIG. 6).

When the air/fuel mixture penetrates into the inside of the bowls 86, the flow rate of air passing through the orifices 94 of the angular sector 92 is smaller than the flow rate of air passing through the other orifices 88 of the bowl 86. As a result, the particles of air and of fuel passing in the vicinity of this sector 92 leave the bowl 86 with a trajectory that is more flared than that of the particles passing in the vicinity of the other orifices 88 of the bowl 86. This leads to a local enlargement 96 of the sheet of sprayed fuel (FIG. 7).

Because of the frustoconical and rotating shape of the air/fuel mixture sheet, each particle of air and of fuel follows a path that is substantially in the form of a frustoconical helix. The local enlargement thus takes on a shape corresponding to those frustoconical helical paths.

In order to ensure that the enlargement 96 crosses the axis 98 of the spark plug 42 and comes as close as possible to the inside end of the spark plug 42, the sector 92 of the bowl 86 needs to be angularly offset by an angle $\alpha$ in the direction opposite to the direction of rotation of the air/fuel mixture, i.e. counterclockwise, relative to a plane 100 containing the axis of the bowl 90 and passing through the angular position around the axis 90 of the bowl at which it is desired for the enlargement to cross the axis 98 of the spark plug 42. In FIG. 6, the plane 100 is represented by a line and it is perpendicular to the plane of the sheet.

The injection system $S_5$ situated circumferentially to the right of the spark plug has a primary swirler matching that described with reference to FIG. 3 so as to produce an air/fuel mixture sheet rotating counterclockwise (arrow E in FIG. 7). This injection system $S_5$ has a mixer bowl 102 with a plurality of orifices 88 that are regularly distributed around the axis of the bowl and that are identical to the orifices of the bowl 86 of the injection system $S_4$. The bowl 102 has an angular sector 104 in which the orifices 96 are of a diameter smaller than the diameter of the other orifices in the bowl 88, thus making it possible to form a local enlargement 105 of the fuel sheet $N_5$ (FIG. 7).

The angular sector 104 of the bowl 102 is angularly offset by an angle $\beta$ in the direction opposite to the direction of rotation of the air/fuel mixture, i.e. in the clockwise direction, relative to a plane 106 containing the axis 108 of the bowl 102 and passing through the angular position about the axis 108 of the bowl 102 where it is desired that the enlargement crosses the axis 98 of the spark plug 42. The angles $\alpha$ and $\beta$ are measured from the middles of each of the sectors 92, 104 of the bowls 86, 102 having the orifices of smaller diameter.

The angular extents of the sectors 92, 104 of the bowls 86, 102 of the injection systems $S_4$ and $S_5$ determine the angular extent of each of the enlargements 96, 105 of the air/fuel mixture sheets $N_4$, $N_5$ around the respective axes 90, 108 of the bowls 86, 102.

With such a configuration, the local deformations 96, 105 of the air/fuel mixture sheets $N_4$, $N_5$ as produced by the injection systems $S_4$ and $S_5$ situated on either side of the spark plug enable droplets of fuel to be projected as close as possible to the inside end of the spark plug 42, thereby increasing the time spent by the particles in the vicinity of the inside end of the spark plug 42 and facilitating ignition of the combustion chamber.

In the embodiment shown in FIG. 6, the angular sectors 92, 104 of the two injection systems $S_4$ and $S_5$ are symmetrical relative to each other about a radial plane containing the axis of the spark plug. Under such circumstances, the angles $\alpha$ and $\beta$ are identical.

Figure 8:
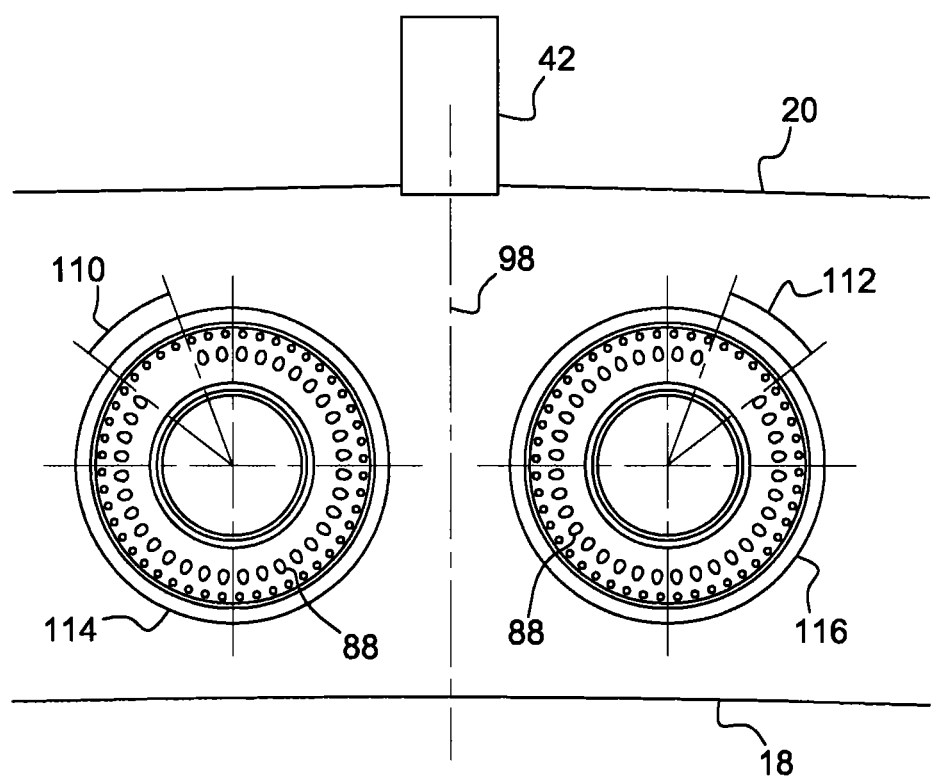
FIG. 8 is a diagrammatic view in cross-section of another variant embodiment of the invention showing injection systems situated on either side of the spark plug.

In another embodiment of the invention, as shown in FIG. 8, the sectors of the bowls that have orifices of reduced diameter are replaced by sectors 110, 112 that have no air injection orifices. These bowls 114, 116 serve to obtain fuel sheets having substantially the same shapes as those obtained using the bowls 86, 102 having respective sectors 92, 104 with orifices 94, 96 of smaller diameter. Only the widths of the enlargements of the fuel sheets in the radial direction are larger because there is no flow of air passing through the sectors 110, 112 of the bowls 114, 116.

It is possible to combine an injection system having a bowl with a sector having orifices of smaller diameter and an injection system having a bowl with a sector having no orifices.

In a practical embodiment of the invention, the sectors 91, 104 of the bowls 86, 102 with orifices 94, 96 of smaller diameter, and the sectors 110, 112 of the bowls 114, 116 having no orifices, all extend angularly over about 50°, and the angles $\alpha$ and $\beta$ are of the order of 80°. The angles $\alpha$ and $\beta$ may lie in the range 0° to 180°.

In practice, the positioning and the angular extents of the two angular sectors 92, 104 having orifices of smaller diameter or of the two sectors 110, 112 having no orifices are determined by three-dimensional simulation. Such simulation takes account of numerous parameters such as the shape and the angle of inclination of the vanes of the swirlers, the flow rate of air from the high pressure compressor, the flow rate of fuel from the injectors, etc.

In the various embodiments of the invention, the spark plug 42 may be positioned at substantially equal circumferential distances from the two adjacent injection systems.

The invention claimed is:

1. An annular combustion chamber of a turbine engine, the annular combustion chamber comprising:
   an inner wall and an outer wall coaxial with the inner wall forming two surfaces of revolution connected together at upstream ends of the inner and outer walls by an annular chamber end wall comprising openings for mounting injection systems, each opening comprising an injector and at least one swirler for producing a rotating air stream that mixes downstream with fuel coming from the injector, and
   an ignition spark plug mounted in an orifice in the outer wall downstream from the injection systems,
   wherein the ignition spark plug is situated circumferentially between adjacent first and second injection systems that are configured to produce two air/fuel mixture sheets rotating in first and second directions, respectively, which are opposite each other, and
   wherein, in the annular combustion chamber, only the first injection system produces the air/fuel mixture sheet rotating in the first direction.

2. A chamber according to claim 1, wherein, as seen from downstream, the first injection system situated circumferentially to a first side of the ignition spark plug produces the air/fuel mixture sheet rotating clockwise and the second injection system situated circumferentially to a second side of the ignition spark plug produces the air/fuel mixture sheet rotating counterclockwise.

3. A chamber according to claim 2, wherein each of the first and second injection systems comprises a bowl having a frustoconical wall downstream from the swirler and comprising an annular row of air injection orifices for producing a frustoconical and rotating sheet of air/fuel mixture, the air injection orifices being distributed and dimensioned such that a resulting air/fuel mixture sheet presents a local enlargement crossing an axis of the ignition spark plug.

4. A chamber according to claim 3, wherein the bowl of at least one of the two injection systems comprises a set of orifices of having a diameter smaller than a diameter of the orifices of the bowl, the set of orifices of diameter smaller than the diameter of the orifices of the bowl being formed over an angular sector of size and angular position that are predetermined to form the local enlargement crossing the axis of the ignition spark plug.

5. A chamber according to claim 4, wherein the orifices of the angular sector of each bowl present a diameter that is at least 40% smaller than the diameter of other orifices in the bowl.

6. A chamber according to claim 4, wherein angular sectors of the two injection systems are symmetrical to each other about a radial plane containing the axis of the ignition spark plug.

7. A chamber according to claim 4, wherein each angular sector extends over an angle of 20° to 50°.

8. A chamber according to claim 3, wherein the bowl of at least one of the two injection systems has no orifices over an angular sector of dimension and position that are predetermined to form the local enlargement crossing the axis of the ignition spark plug.

9. A chamber according to claim 1, wherein the ignition spark plug is positioned at equal circumferential distances from the adjacent first and second injection systems.

10. A turbine engine, or an airplane turbojet, or a turboprop, comprising a combustion chamber according to claim 1.

* * * * *